United States Patent
Pasupuleti et al.

(10) Patent No.: US 10,936,362 B2
(45) Date of Patent: Mar. 2, 2021

(54) DECENTRALIZED RESOURCE SCHEDULING

(71) Applicant: VMware, Inc., Palo Alto, CA (US)

(72) Inventors: Swarnalatha Pasupuleti, Bangalore (IN); Sathyamurthy Dattathreya Hassan, Bangalore (IN); Gurusreekanth Chagalakondu, Bangalore (IN); Akhil Sadashiv Hingane, Pune (IN); Sivaraj M, Bangalore (IN); Jeevan Prabhu, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 9 days.

(21) Appl. No.: 16/511,351

(22) Filed: Jul. 15, 2019

(65) Prior Publication Data

US 2021/0019176 A1    Jan. 21, 2021

(51) Int. Cl.
*G06F 9/48* (2006.01)
*G06F 9/50* (2006.01)
*G06F 9/455* (2018.01)

(52) U.S. Cl.
CPC ........ *G06F 9/4856* (2013.01); *G06F 9/45558* (2013.01); *G06F 9/5044* (2013.01); *G06F 2009/4557* (2013.01); *G06F 2009/45583* (2013.01)

(58) Field of Classification Search
CPC .................................................. G06F 9/4856
See application file for complete search history.

(56) References Cited

U.S. PATENT DOCUMENTS 10,754,704 B2 * 8/2020 Rao ........................ G06F 9/5016
2017/0060642 A1 * 3/2017 Castellano .......... H04L 67/1008

* cited by examiner

*Primary Examiner* — Charlie Sun
(74) *Attorney, Agent, or Firm* — Thomas | Horstemeyer LLP

(57) ABSTRACT

Disclosed are various embodiments for distributed resource scheduling. An eviction request from a first host is received. The eviction request comprises data regarding a virtual machine to be migrated from the first host. The eviction request is then broadcast to a plurality of hosts. A plurality of responses are received from the plurality of hosts, each response comprising a score representing an ability of a respective one of the plurality of hosts to act as a new host for the virtual machine. A second host is selected from the plurality of hosts to act as the new host for the virtual machine based at least in part on the score in each of the plurality of responses. Then, a response is sent to the first host, the response containing an identifier of the second host.

20 Claims, 4 Drawing Sheets

DECENTRALIZED RESOURCE SCHEDULING

BACKGROUND

Virtual machines may be hosted by a cluster or group of host machines operating together. Often, as the workload of one virtual machine grows, it may begin to consume more resources than that are available from the host machine. This can occur, for example, if multiple virtual machines on the same host experience an increase in workload. To prevent a single host from becoming over-utilized, thereby causing individual virtual machines housed by the host to experience performance degradation, virtual machines may be migrated from an over-subscribed host to an under-utilized host with unused or excess computing capacity.

Often, a central monitoring program is responsible for identifying over-subscribed and under-utilized hosts and migrating virtual machines to balance the workload across the hosts. Such central monitoring programs often query each host for its status and current resource consumption and make a decision regarding whether to migrate a virtual machine based on each host's response. However, the central monitoring program often serves as a single point of failure and as a performance bottleneck. For example, if the central monitoring program experiences a fault and ceases execution, virtual machines may not be migrated from over-utilized to under-utilized hosts as required. As another example, as the number of hosts supervised by the central monitoring program increases, the time required to evaluate all hosts increases proportionally. As a result, if a central monitoring program oversees too many hosts, it may not be able to identify over-utilized hosts in a timely manner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for decentralized resource scheduling. In contrast to orchestrated approaches, which directs hosts to migrate virtual machines to address resource contention or oversubscription, a group of hosts takes a choreographed approach to collaboratively manage migration of virtual machines between hosts to address resource contention issues. For example, a host can broadcast a request to migrate a virtual machine. The request can include the resource requirements for hosting the virtual machine. Other hosts can then determine whether or not they are capable of hosting the virtual machine. The virtual machine can then be migrated to a new host that has the most available resources for hosting the virtual machine. In the following discussion, a general description of the system and its components is provided, followed by a discussion of the operation of the same.

Figure 1:
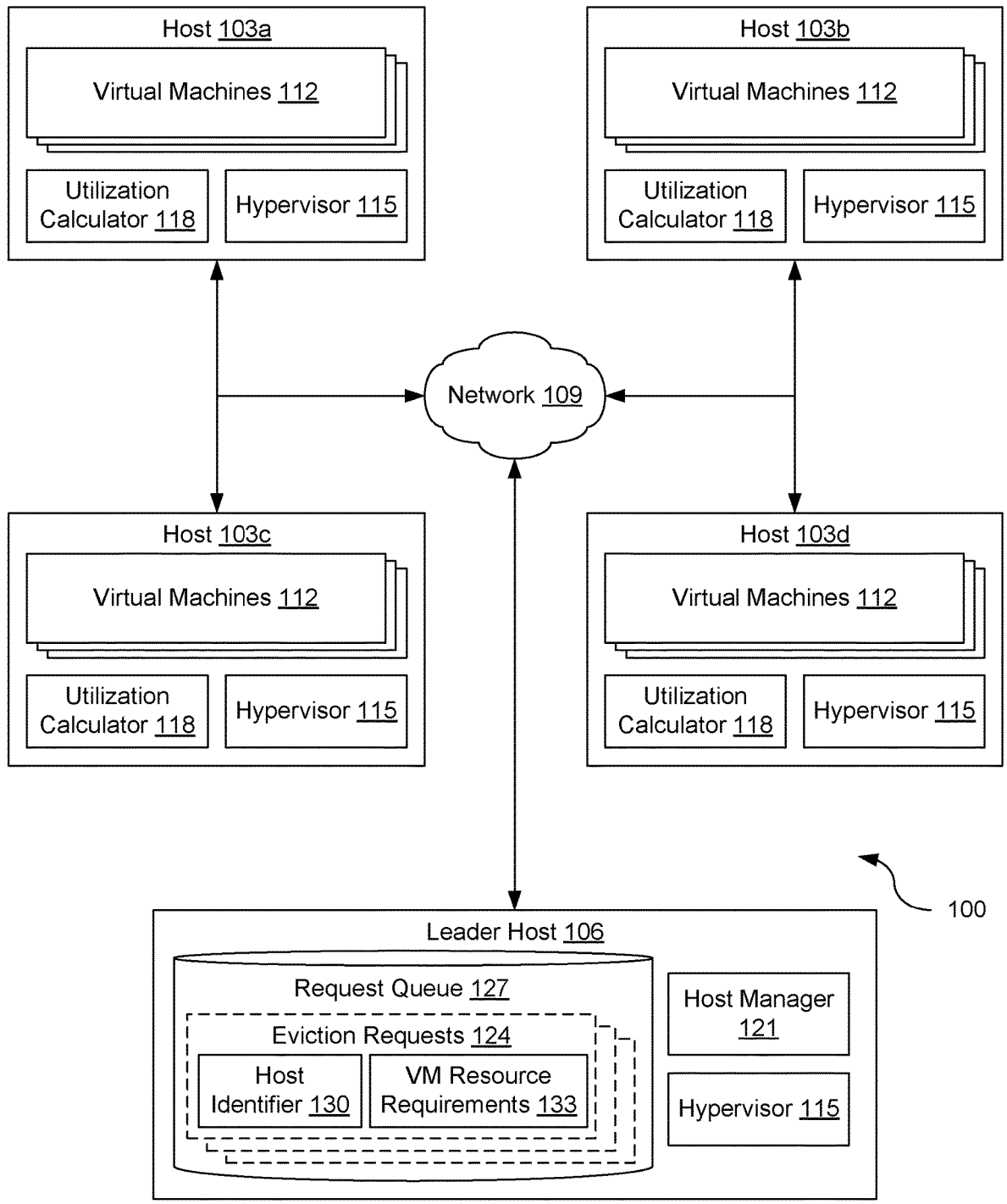
FIG. 1 is a drawing of a network environment according to various embodiments of the present disclosure.

With reference to FIG. 1, shown is a network environment 100 according to various embodiments. The network environment 100 includes a host 103a, host 103b, host 103c, host 103d (collectively, the "hosts 103"), and a leader host 106, which are in data communication with each other via a network 109. The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The hosts 103 are representative of individual computing devices, such as servers, that provide a managed execution environment for one or more virtual machines 112. The hosts 103 may be collocated in a single location (e.g., a data center or a rack within a data center) or dispersed across multiple geographic locations (e.g., in multiple data centers). Hosts 103 may also provide hardware based capabilities, such as hardware or memory segmentation, direct access to compute accelerators (e.g., graphics processor units (GPUs), cryptographic coprocessors, digital signal processors (DSPs), field programmable gate arrays (FPGAs), etc.).

The virtual machines 112 can represent software emulations of a computer system. Accordingly, a virtual machine 112 can provide the functionality of a physical computer sufficient to allow for installation and execution of an entire operating system and any applications that are supported or executable by the operating system. As a result, a virtual machine 112 can be used as a substitute for a physical machine.

The hypervisor 115, which may sometimes be referred to as a virtual machine monitor (VMM), is an application or software stack that allows for creating and running virtual machines 112. Accordingly, a hypervisor 115 can be configured to provide guest operating systems with a virtual operating platform, including virtualized hardware devices or resources, and manage the execution of guest operating systems within a virtual machine execution space provided the hosts 103 by the hypervisor 115. In some instances, a hypervisor 146 may be configured to run directly on the hardware of the hosts 103 in order to control and manage the hardware resources of the hosts 103 provided to the virtual machines 115 resident on the hosts 103. In other instances, the hypervisor 115 can be implemented as an application executed by an operating system executed by the hosts 103, in which case the virtual machines 112 may run as a thread, task, or process of the hypervisor 115 or operating system. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The utilization calculator 118 can be executed by individual hosts 103 to determine the resource utilization of the hosts 103. For example, the utilization calculator 118 can identify the amount of resources used or the amount of resource contention being experienced by a host 103. This can include the amount of resources consumed by an individual virtual machine 112 hosted by the hypervisor 115 or the amount of resource contention being experienced by an individual virtual machine 112. Although depicted as a separate application, the functions of the utilization calculator 118 may be implemented by the hypervisor 115 in some implementations.

A leader host 106 may also be elected by or selected from the hosts 103. Like the hosts 103, the leader host 106 is representative of a computing device, such as a server, that can process requests and responses. The leader host 106 may also be able to provide a managed execution environment for one or more virtual machines 112. Accordingly, the leader host 106 may have a hypervisor 115 installed and executing on the leader host 106. However, when a host 103 is elected to act as a leader host 106, the leader host 106 may migrate any currently hosted virtual machines 112 to other hosts 103 in order for a host manager 121 to be able to perform its functions without suffering any performance impacts resulting from the cohosting of virtual machines 112 on the leader host 106.

The host manager 121 can evaluate and respond to eviction requests 124 received from hosts 103 to migrate virtual machines 112 to other hosts 103. As discussed in further detail later, the host manager 121 can forward or broadcast eviction requests 124 to other hosts 103. The other hosts 103 can then provide the host manager 121 with their responses indicating their respective ability to host the virtual machine 112. The host manager 121 can then evaluate the responses to determine to which host 103 the virtual machine 112 should be migrated. Finally, the host manager 121 can initiate the migration of the virtual machine 112 between the hosts 103. In some embodiments, some or all of the functions of the host manager 121 may be implemented or performed by the hypervisor 115.

Each eviction request 124 represents a request to migrate a virtual machine 112 from one host 103 to another host 103. Accordingly, the eviction request 124 can include the host identifier 130 of the host 103 making the eviction request 124 and virtual machine (VM) resource requirements 133 of the virtual machine 112 to be migrated. The host identifier 130 can include any identifier that uniquely represents a host 103 with respect to another host 103. Illustrative examples of host identifiers 130 include media access control (MAC) addresses of network interfaces of a host 103, a globally unique identifier (GUID) or universally unique identifier (UUID) assigned to the host 103, or a serial number associated with the host 103. VM resource requirements 133 represent information or data related to the resource requirements 133 of a virtual machine 112. Illustrative examples of VM resource requirements 133 include the amount of memory assigned to or consumed by the virtual machine 112, the number of virtual processors assigned to the virtual machine 112, the amount of processor cycles assigned to or consumed by the virtual machine 112, the number and/or type of compute accelerators provisioned for the virtual machine 112, or the amount of network bandwidth allocated for or consumed by the virtual machine 112.

Eviction requests 124 are stored in a request queue 127, allowing eviction requests 124 to be processed in the order in which they are received. Although eviction requests 124 may be stored in a queue data structure, allowing for first-in, first-out processing of eviction requests 124, other data structures may be used in alternative embodiments. Examples of alternative data structures include stacks, priority queues, heaps, trees, etc.

Next, a general description of the operation of the various components of the network environment 100 is provided. Although the following description provides an illustrative example of the operation of individual components of the network environment 100 and the interaction between the components of the network environment 100, more detailed descriptions of the operation of the individual components is provided in the discussion accompanying the subsequent figures.

To begin, the hosts 103 elect one of the hosts 103 to act in the capacity of the leader host 106. Any leader election/selection algorithm may be used to select one of the hosts 103 as a leader host 106. In some embodiments, a secondary leader host 106 may also be elected from the hosts 103. The secondary leader host 106 may act as a backup to the leader host 106. Accordingly, the entire state of the leader host 106 may be duplicated with the secondary leader host 106 so that in the event that the leader host 106 becomes unavailable, the secondary leader host 106 can take over to choreograph the assignment of virtual machines 112. In other implementations, if a leader host 106 becomes unavailable, a new host 103 may be elected as a replacement leader host 106. Upon election of a host 103 as a leader host 106, any virtual machines 112 executing on the leader host 106 may be migrated to other hosts 103. Moreover, the leader host 106 may announce its election to the other hosts 103.

Once a host has been elected as a leader host 106, each host 103 can execute the utilization calculator 118. The utilization calculator 118 may continuously monitor and analyze each host's 103 resource utilization. If the resource utilization of the host 103 violates one or more rules or constraints, then the utilization calculator 118 can select a virtual machine 112 for migration to another host 103.

Accordingly, the utilization calculator 118 can create and send an eviction request 124 to the host manager 121 of the leader host 106. The eviction request 124 can include the host identifier 130 of the host 103, and all relevant VM resource requirements 133. Upon receipt of the eviction request 124, the host manager 121 of the leader host 106 can relay the eviction request 124 to other hosts 103. After receiving respective responses for the other hosts 103, the host manager 121 can determine the host 103 to which the virtual machine 112 should migrate. The host manager 121 can then send a response to the utilization calculator 118 identifying the selected new host 103.

For example, if the utilization calculator 118 of host 103a determines that host 103a is experiencing processor contention, the utilization calculate 118 can send an eviction request 124 to the leader host 106 that includes a host identifier 130 for host 103a and the VM resource requirements 133 of a virtual machine 112 executing on host 103a. The host manager 121 leader host 106 can then forward the eviction request 124 to hosts 103b, 103c, and 103d. The utilization calculators 118 on hosts 103b, 103c, and 103d can determine their respective abilities to provide a suitable host environment for the virtual machine 112 of host 103a and provide an indication of their abilities (e.g., in the form of a score) in their responses to the leader host 106. The host manager 121 can then determine which of hosts 103b, 103c, or 103d would be the best candidate for acting as the new host 103 for the virtual machine 112 executing on host 103a. The host manager 121 can then provide a response to the utilization calculator 118 of host 103a identifying the selected new host 103. In response, the hypervisor 115 of host 103a can begin a migration of the virtual machine 112 to the selected new host 103.

Figure 2:
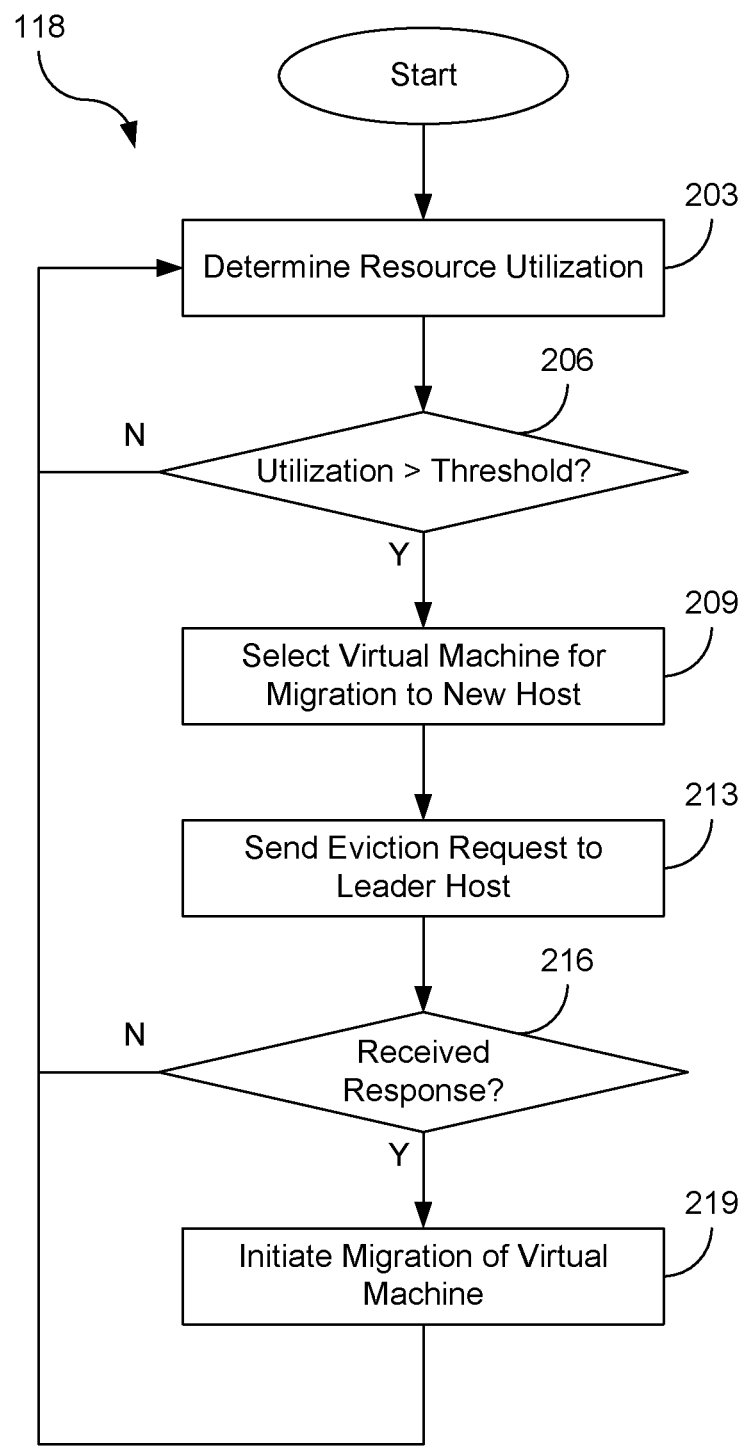
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the utilization calculator 118 executing on a host 103. It is understood that the flowchart of FIG. 2 provides merely an example of the many different types of functional arrangements that can be employed to implement the operation of the portion of the utilization calculator 118. As an alternative, the flowchart of FIG. 2 can be viewed as depicting an example of elements of a method implemented in a host 103 in the network environment 100.

Beginning at step 203, the utilization calculator 118 determines the current resource utilization levels and resource utilization rates. This may be done, for example, by invoking system calls provided by a monitoring system of the operating system of the host 103. As another example, a monitoring agent may report this information to the utilization calculator 118 on a periodic basis.

Then at step 206, the utilization calculator 118 compares the resource utilization metrics for the host 103 with one or more predefined eviction thresholds. If the resource utilization of any computing resource exceeds any eviction threshold, then the process continues to step 209. Otherwise, the process returns back to step 203 for further monitoring of the resource utilization of the host 103.

An eviction threshold is a threshold value that, if surpassed, indicates that at least one virtual machine 112 should be migrated to another host 103 if possible. An eviction threshold may be set in order to prevent performance degradation for virtual machines 112 executed by the hypervisor 115 of the host 103. For example, an eviction threshold could specify that processor utilization should not exceed a predefined level (e.g., 50%, 75%, 90%, etc.) for more than a predefined period of time (e.g., one minute, five minutes, 15 minutes, etc.). As another example, an eviction threshold could specify that memory utilization should not exceed a predefined level for more than a predefined period of time or that network bandwidth utilization should not exceed a predefined level for more than a predefined period of time. Similarly, an eviction threshold could specify a maximum level of resource contention (e.g., no more than 2%, 5% or 10% contention for processor cycles, physical memory pages, etc.). Other eviction thresholds may also be specified by an administrative user as appropriate.

Next at step 209, the utilization calculator 118 can select which virtual machine 112 should be migrated to a host 103. The virtual machine 112 may be selected in any number of ways. For example, the virtual machine 112 could be selected at random. As another example, the virtual machine 112 can be selected based on the particular eviction threshold that was violated. As an example, if an eviction threshold related to processor utilization was violated, then the most processor intensive virtual machine 112 might be selected for eviction from the host 103 and migration to a new host 103. As another example, if an eviction threshold related to memory utilization or contention were violated, the virtual machine 112 that consumed the most amount of memory or had the highest dirty page rate (a measure of how frequently a virtual machine 112 is writing to memory) might be selected for migration to a new host 103. Similarly, if an eviction threshold related to network utilization were violated, then the virtual machine 112 with the highest network bandwidth utilization rate might be selected for eviction and migration to a new host 103.

Subsequently at step 213, the utilization calculator 118 creates an eviction request 124 and sends it to the host service 121 of the leader host 106. The eviction request 124 can include the host identifier 130 for the host 103 and virtual machine resource requirements 133, such as the amount of memory allocated to the virtual machine 112, the dirty page rate of the virtual machine 112, the amount of processor resources consumed by the virtual machine 112, the amount of network bandwidth consumed by the virtual machine 112, the number and type of compute accelerators assigned to the virtual machine 112, etc.

Then at step 216, the utilization calculator 118 waits to receive a response from the host service 121 of the leader host 106. If no response is received within a time-out period, the utilization calculator 118 may determine that either no host 103 is available for hosting the virtual machine 113 or that the leader host 106 is unavailable for processing the eviction request 124. To address either of these situations, the process can return to step 203 in order to again select a virtual machine 112 for migration in the event that a host 103 later becomes able to host the virtual machine 112 or the leader host 106 becomes available for processing eviction requests 124. However, if a response is received, the process can continue to step 219. The response can include a host identifier 130 of new host (e.g., host 103b, 103c, or 103d) to which the virtual machine 112 is to be migrated.

Next, at step 219, the utilization calculator 118 can initiate migration of the virtual machine 112 to the new host 103 identified in the response received at step 216. If the utilization calculator 118 is implemented as a standalone program or module, then the utilization calculator 118 may send a message to the hypervisor 115 to initiate migration of the virtual machine 112 selected at step 209 and include the host identifier 130 received at step 216 in the message to the hypervisor 115. However, if the utilization calculator is implemented as a portion or module of the hypervisor 115, then the utilization calculator 118 may initiate migration of the virtual machine 112 to the host specified in the response received at step 216. After migration occurs, the process then loops back to step 203 to continue the monitoring of the resource usage of the host 103 in case additional migrations of additional virtual machines 112 is required in the future.

Figure 3:
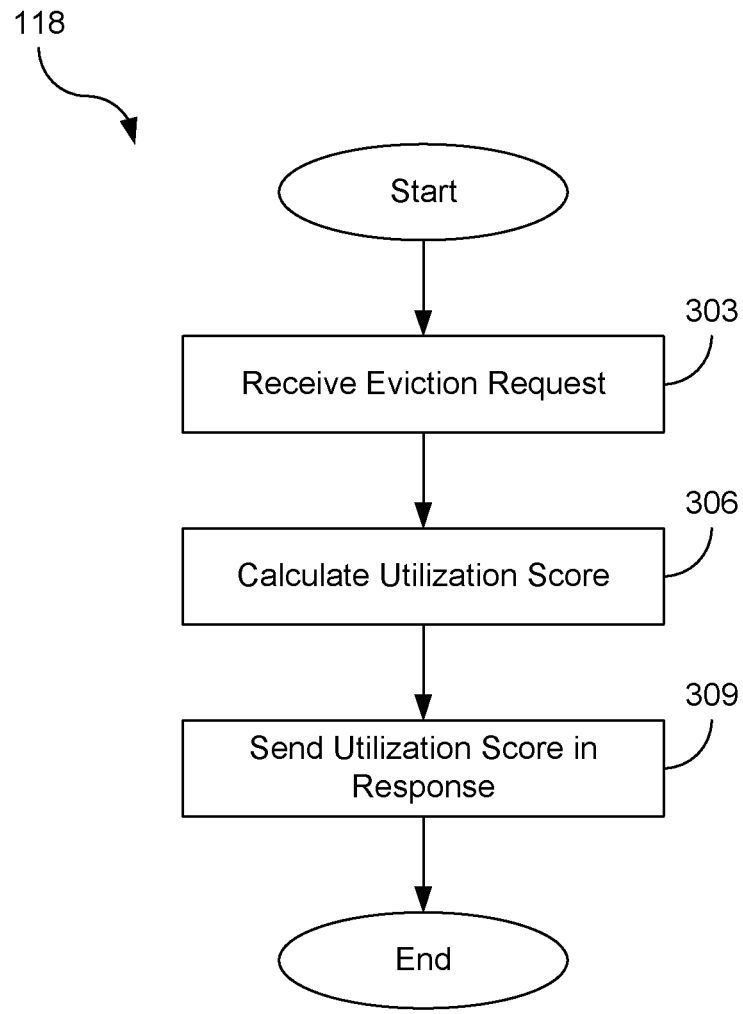
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the utilization calculator 118 executing on a host 103. It is understood that the flowchart of FIG. 3 provides merely an example of the many different types of functional arrangements that can be employed to implement the operation of the portion of the utilization calculator 118. As an alternative, the flowchart of FIG. 3 can be viewed as depicting an example of elements of a method implemented in a host 103 in the network environment 100.

Beginning at step 303, the utilization calculator 118 receives an eviction request 124 from the host manager 121 executing on the leader host 106. In response to receiving the eviction request 124, the utilization calculator 118 can extract the VM resource requirements 133 from the eviction request 124 for use in the subsequent steps.

Next at step 306, the utilization calculator 118 calculates a utilization score that reflects that ability of the host 103 to execute the virtual machine 112. The utilization score may be based, at least in part, on the VM resource requirements 133 included in the eviction request 124. In some implementations, the utilization score may be normalized or weighted so that the utilization scores can be used as a benchmark for comparing hosts 103 for selection as a new host 103 for the virtual machine 112. For instance, utilization scores may be normalized to fit on a scale with values ranging from 0-100, with a score of 0 indicating that a host 103 is unable to host the virtual machine 112 without experiencing performance degradation or resource contention. Higher scores can indicate that a host 103 is able to host the virtual machine 112, with higher scores indicating a relatively greater ability to host the virtual machine 112 while minimizing the possibility of future resource contention or performance degradation. The utilization score may also be calculated using any number of approaches, examples of which are described in the following paragraphs.

In one illustrative example, the utilization calculator 118 could multiply the expected remaining percentages of various resource types to generate a utilization score. For instance, if the host 103b would have twenty percent (20%) of its processor resources, fifty percent (50%) of its memory resources, and fifteen percent (15%) of its network bandwidth remaining free if it were to begin hosting the virtual machine 112 on host 103a, the utilization could use the following simplistic formula in equation (1):

Utilization Score=100*(Free Processor*Free Memory*Free Bandwidth)  (1)

to calculate a utilization score of 1.5. In this model, if the remaining amount of any computing resource were zero, the resulting utilization score would be zero, indicating that the host 103 would be unable to host the virtual machine 112 without experiencing performance degradation or resource contention. Likewise, if any one resource were already heavily utilized, the low percentage of that resource remaining free would result in a low utilization score. As a result, under-subscribed hosts 103 will tend to have high utilization scores using this simplistic model. However, more nuanced models may also be used as appropriate for specific situations.

As an example of a more nuanced model, the utilization calculator 118 can calculate a utilization score based at least in part on a weighted average of scores that represent individual factors. Such a utilization score could be represented by the following equation:

$$s = \Sigma_{i=1}^{n}(f_i \times w_i) \quad (2)$$

where $f_i \in [0,100]$ is the percentage score of the individual factor $f_i$ and $w_i \in [0,1]$ is the relative weight attributed to factor $f_i$ such that $\Sigma_{i=1}^{n} w_i = 1.0$.

One example of a weighted factor is a CPU abundancy factor, which represents the percentage of the CPU for a host 103 that will remain unallocated after the virtual machine 112 is migrated to that host 103. The higher the CPU abundancy factor, the better, as it indicates that the CPU of the host 103 is lightly loaded. By considering the utilization of the CPU of the host 103 post-migration instead of pre-migration, this factor also indirectly takes into account the impact that the virtual machine 113 will have on utilization of the CPU of the host 103 if it were migrated.

Another example of a weighted factor is a memory abundancy factor, which represents the percentage of memory of the host 103 that will remain free or otherwise unallocated after the virtual machine 113 is migrated to that host 103. The higher the percentage of memory that will remain, the better, as it indicates that the memory of the host 103 is lightly loaded.

A third example of a weighted factor is a memory state migration time, which represents how long it will take to transfer the state of the memory allocated to a virtual machine 112 from one host 103 to another host 103. To compute this factor, each host 103 can determine the data transfer speed from itself to the host 103 where the virtual machine 112 is currently residing. The host 103 can then compute the amount of time needed to transfer the memory state of the virtual machine 112. In order to compute a percentage score, it may be assumed that a fixed amount of time is desirable for migration, which can be used as a normalizing factor. For example, if a first host 103a and a second host 103b can transfer the memory state of the virtual machine 112 from the source host 103c in fifteen (15) seconds and ten (10) seconds respectively, and a global configuration specifies sixty (60) seconds as the maximum desirable transfer time, then the percentage score can be calculated as $$\left(1 - \frac{\text{time taken}}{\text{acceptable time}}\right) \times 100,$$

which would provide scores of 75 and 83 for hosts 103a and 103b, respectively.

A fourth example of a weighted factor is a disk migration time. If the source and target hosts 103 do not have shared storage on the disks where the virtual machine 112 resides (e.g., shared storage on a storage area network (SAN) or network attached storage (NAS) device), then the time needed to transfer the virtual machine disk files should be determined and a percentage score assigned using the same or similar methods as those described above for the memory state migration time.

Then at step 309, the utilization calculator 118 can send the utilization score to the host manager 121 in response to the eviction request 124 received at step 303. Once the utilization score is sent, this portion of the utilization calculator 118 may cease operating until a new eviction request 124 is received.

Figure 4:
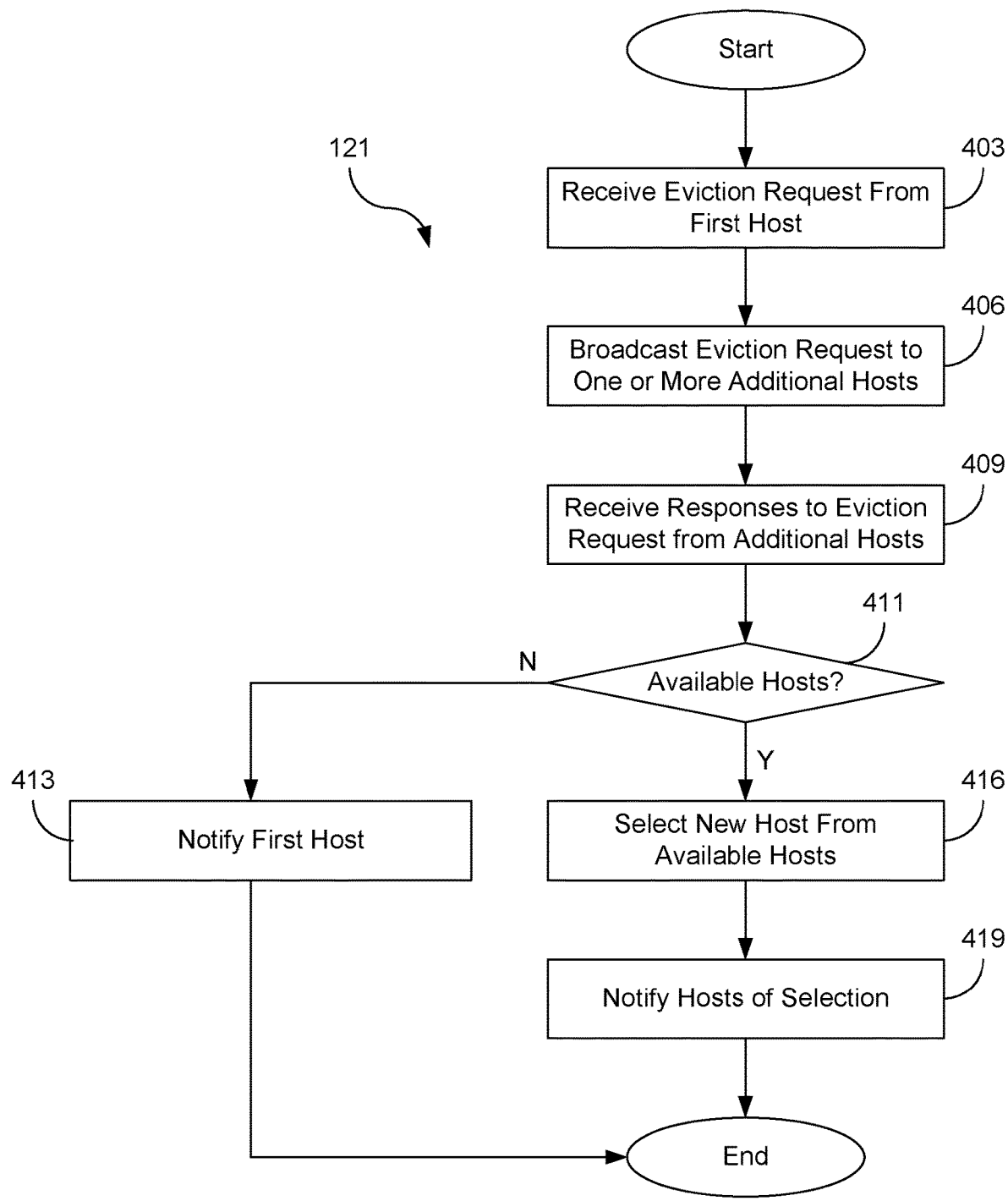
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the host manager 121. It is understood that the flowchart of FIG. 4 provides merely an example of the many different types of functional arrangements that can be employed to implement the operation of the portion of the host manager 121 as described herein. As an alternative, the flowchart of FIG. 4 can be viewed as depicting an example of elements of a method implemented in the leader host 106 according to one or more embodiments.

Beginning with step 403, the host manager 121 can receive an eviction request 124 from a first host 103, such as host 103a. In response to receiving the eviction request 124, the host manager 121 can add the eviction request 124 to a request queue 127, allowing the host manager 121 to process eviction requests 124 in the order that they are received.

Then at step 406, the host manager 121 retrieves the eviction request 124 from the request queue 127 and broadcasts it to other hosts 103, such as hosts 103b, 103c, and 103d.

Next at step 409, the host manager 121 receives responses from the hosts 103b, 103c, and 103d. In some implementations, the host manager 121 may wait until all responses from all hosts 103 are received. In other implementations, the host manager 121 may wait for a predetermined period of time (e.g., a timeout). Any responses not received during the predetermined period of time will be ignored. The use of a timeout period allows for the process to continue even if one or more potential hosts 103 are unavailable (e.g., because they are offline for maintenance). The responses may include a utilization score indicating the ability of the individual hosts 103*b*, 103*c*, and 103*d* to host the virtual machine 112. The utilization score may be calculated using a variety of approaches, such as by using the example formula previously set forth in equation (1).

Subsequently at step 411, the host manager 121 determines whether there are any potential new hosts 103 to which the virtual machine 112 could be migrated. For example, if no responses are received (e.g., because every other host in the cluster is offline for maintenance or due to an unexpected or unplanned shutdown), then this could indicate that there are no potential hosts 103. As another example, if all of the scores in the responses contained a utilization score of zero, this could indicate that all other hosts 103 lack sufficient resources for the virtual machine 112. If there are no available hosts 103, then execution proceeds to step 413. If there is at least one potential host 103, then execution instead proceeds to step 416.

If execution proceeds to step 413, then the host manager 121 may send a notification to host 103*a* indicating that no potential hosts are currently available. However, in some implementations, the host manager 121 may simply fail to send a response to host 103*a*, whereby the failure to provide a response can indicate that there are no potential hosts currently available.

However, if execution proceeds to step 416, then the host manager 121 may select a new host 103 for the virtual machine 112. The selection may be based on the responses, including the utilization score in the responses. For example, the host manager 121 may select as the new host 103 a host 103 that responded with the highest utilization score. To illustrate, if host 103*b* provided a response that includes a utilization score of "15," host 103*c* provided a response with a utilization score of "33," and host 103*d* provided a response with a utilization score of "0," then the host manager 121 could select host 103*c* as the new host for the virtual machine 112.

Then at step 419, the host manager service 121 can send a response to the host 103 that requested migration, such as host 103*a* in this example. The response can include, for example, the host identifier 130 of the host 103 selected at step 416, such as host 103*c* in this continuing example. This response can cause host 103*a* to initiate a migration of the virtual machine 112 from host 103*a* to host 103*c*.

Although the hypervisor 115, utilization calculator 118, and host manager 121, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the utilization calculator 118 and host manager 121. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system or other system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 2-4 show a specific order of execution, it is understood that the order of execution can differ from that which is depicted. For example, the order of execution of two or more blocks can be scrambled relative to the order shown. Also, two or more blocks shown in succession in FIGS. 2-4 can be executed concurrently or with partial concurrence. Further, in some embodiments, one or more of the blocks shown in FIGS. 2-4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the hypervisor 115, utilization calculator 118, and host manager 121, that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAIVI). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the hypervisor 115, utilization calculator 118, and host manager 121, can be implemented and structured in a variety of ways. For example, one or more applications described can be implemented as modules or components of a single application. Further, one or more applications described herein can be executed in shared or separate computing devices or a combination thereof.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, we claim:

1. A system, comprising:
   a computing device comprising a processor and a memory;
   machine-readable instructions stored in the memory that, when executed by the processor, cause the computing device to at least:
   receive an eviction request from a first host, the eviction request comprising data regarding a virtual machine to be migrated from the first host;
   broadcast the eviction request to a plurality of hosts;
   receive a plurality of responses from the plurality of hosts, each response comprising a score representing an ability of a respective one of the plurality of hosts to act as a new host for the virtual machine;
   select a second host from the plurality of hosts to act as the new host for the virtual machine based at least in part on the score in each of the plurality of responses; and
   send a response to the first host, the response containing an identifier of the second host.

2. The system of claim 1, wherein the machine-readable instructions further cause the computing device to determine whether any of the plurality of hosts are available as the new host for the virtual machine based at least in part on the score in each of the plurality of responses.

3. The system of claim 1, wherein the machine-readable instructions that cause the computing device to select the second host based at least in part on the score in each of the plurality of responses further comprises:
   select a response in the plurality of responses that comprises the highest score; and
   select a host associated with the response that comprises the highest score as the second host.

4. The system of claim 1, wherein the eviction request is stored in a request queue stored in the memory of the computing device.

5. The system of claim 1, wherein the data regarding the virtual machine comprises an amount of memory allocated to the virtual machine.

6. The system of claim 1, wherein the data regarding the virtual machine comprises a central processor utilization (CPU) metric.

7. The system of claim 1, wherein the data regarding the virtual machine comprises an amount of bandwidth consumed by the virtual machine.

8. A method, comprising
   receiving an eviction request from a first host, the eviction request comprising data regarding a virtual machine to be migrated from the first host;
   broadcasting the eviction request to a plurality of hosts;
   receiving a plurality of responses from the plurality of hosts, each response comprising a score representing an ability of a respective one of the plurality of hosts to act as a new host for the virtual machine;
   selecting a second host from the plurality of hosts to act as the new host for the virtual machine based at least in part on the score in each of the plurality of responses; and
   sending a response to the first host, the response containing an identifier of the second host.

9. The method of claim 8, further comprising determining whether any of the plurality of hosts are available as the new host for the virtual machine based at least in part on the score in each of the plurality of responses.

10. The system of claim 8, wherein selecting the second host based at least in part on the score in each of the plurality of responses further comprises:
    selecting a response in the plurality of responses that comprises the highest score; and
    selecting a host associated with the response that comprises the highest score as the second host.

11. The system of claim 8, wherein the eviction request is stored in a request queue.

12. The system of claim 8, wherein the data regarding the virtual machine comprises an amount of memory allocated to the virtual machine.

13. The system of claim 8, wherein the data regarding the virtual machine comprises a central processor utilization (CPU) metric.

14. The system of claim 8, wherein the data regarding the virtual machine comprises an amount of bandwidth consumed by the virtual machine.

15. A non-transitory, computer readable medium that comprises machine-readable instructions that, when executed by a processor of a computing device, cause the computing device to at least:
    receive an eviction request from a first host, the eviction request comprising data regarding a virtual machine to be migrated from the first host;
    broadcast the eviction request to a plurality of hosts;
    receive a plurality of responses from the plurality of hosts, each response comprising a score representing an ability of a respective one of the plurality of hosts to act as a new host for the virtual machine;
    select a second host from the plurality of hosts to act as the new host for the virtual machine based at least in part on the score in each of the plurality of responses; and
    send a response to the first host, the response containing an identifier of the second host.

16. The non-transitory, computer readable medium of claim 1, wherein the machine-readable instructions further cause the computing device to determine whether any of the plurality of hosts are available as the new host for the virtual machine based at least in part on the score in each of the plurality of responses.

17. The non-transitory, computer readable medium of claim 1, wherein the machine-readable instructions that cause the computing device to select the second host based at least in part on the score in each of the plurality of responses further comprises:

selecting a response in the plurality of responses that comprises the highest score; and selecting a host associated with the response that comprises the highest score as the second host.

18. The non-transitory, computer readable medium of claim 1, wherein the data regarding the virtual machine comprises an amount of memory allocated to the virtual machine.

19. The non-transitory, computer readable medium of claim 1, wherein the data regarding the virtual machine comprises a central processor utilization (CPU) metric.

20. The non-transitory, computer readable medium of claim 1, wherein the data regarding the virtual machine comprises an amount of bandwidth consumed by the virtual machine.

\* \* \* \* \*